United States Patent
Dettman et al.

(10) Patent No.: US 9,542,496 B2
(45) Date of Patent: Jan. 10, 2017

(54) EFFECTIVE INGESTING DATA USED FOR ANSWERING QUESTIONS IN A QUESTION AND ANSWER (QA) SYSTEM

(71) Applicant: International Business Machines Corporation, Armonk, NY (US)

(72) Inventors: Elizabeth T. Dettman, Rochester, MN (US); Joel C. Dubbels, Eyota, MN (US); Andrew R. Freed, Cary, NC (US); John E. Petri, St. Charles, MN (US); Michael W. Schroeder, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/295,556

(22) Filed: Jun. 4, 2014

(65) Prior Publication Data
US 2015/0356181 A1    Dec. 10, 2015

(51) Int. Cl.
*G06F 17/30* (2006.01)
(52) U.S. Cl.
CPC ... *G06F 17/30867* (2013.01); *G06F 17/30654* (2013.01)
(58) Field of Classification Search
CPC .................................................. G06F 17/30867
(Continued)

(56) References Cited

U.S. PATENT DOCUMENTS 5,895,466 A * 4/1999 Goldberg .......... G06F 17/30654
5,918,222 A * 6/1999 Fukui .................... G06Q 10/10
(Continued)

FOREIGN PATENT DOCUMENTS

| CN | 101566998 | 10/2009 |
|---|---|---|
| CN | 102637192 | 8/2012 |

(Continued)

OTHER PUBLICATIONS

List of IBM or Patent Applications Treated as Related (Appendix P), 2 pages.

(Continued)

*Primary Examiner* — Noosha Arjomandi
(74) *Attorney, Agent, or Firm* — Francis Lammes; Stephen J. Walder, Jr; William J. Stock

(57) ABSTRACT

A mechanism is provided, in a data processing system comprising a processor and a memory configured to implement a question and answer (QA) system, for effectively ingesting data for answering questions in the QA system. A received input question having a set of question characteristics is parsed, which are compared to question characteristics associated with a set of previous questions. Responsive to the set of question characteristics matching the question characteristics associated with one or more previous questions above a related-question predetermined threshold, identification is made as to whether answers to the one or more previous questions were obtained from static information sources or real-time information sources. Responsive to the answers to the one or more previous questions being obtained from the real-time information sources above the predetermined real-time threshold, real-time information sources related to the characteristics of the input question are initially utilized to answer the input question.

20 Claims, 6 Drawing Sheets

(58) Field of Classification Search
USPC .......................................................... 707/728
See application file for complete search history.

(56) References Cited

U.S. PATENT DOCUMENTS

| | | | |
|---|---|---|---|
| 6,856,986 B1* | 2/2005 | Rossides | G06Q 30/02 |
| 7,454,393 B2 | 11/2008 | Horvitz et al. | |
| 7,783,473 B2 | 8/2010 | Bangalore et al. | |
| 8,214,734 B2 | 7/2012 | Grabarnik et al. | |
| 8,429,179 B1* | 4/2013 | Mirhaji | G06F 17/30312 |
| | | | 707/756 |
| 9,141,660 B2 | 9/2015 | Clark et al. | |
| 9,158,772 B2 | 10/2015 | Clark et al. | |
| 9,158,773 B2 | 10/2015 | Clark et al. | |
| 9,286,153 B2 | 3/2016 | Giffels et al. | |
| 2007/0022109 A1* | 1/2007 | Imielinski | G06F 17/30401 |
| 2009/0287678 A1 | 11/2009 | Brown et al. | |
| 2010/0191686 A1 | 7/2010 | Wang et al. | |
| 2011/0066587 A1 | 3/2011 | Ferrucci et al. | |
| 2011/0125734 A1* | 5/2011 | Duboue | G09B 7/00 |
| | | | 707/723 |
| 2011/0125783 A1 | 5/2011 | Whale et al. | |
| 2011/0153312 A1 | 6/2011 | Roberts | |
| 2011/0320187 A1 | 12/2011 | Motik et al. | |
| 2012/0041950 A1 | 2/2012 | Koll et al. | |
| 2012/0059816 A1 | 3/2012 | Narayanan et al. | |
| 2012/0078890 A1 | 3/2012 | Fan et al. | |
| 2012/0078891 A1 | 3/2012 | Brown et al. | |
| 2012/0278321 A1 | 11/2012 | Traub et al. | |
| 2013/0007055 A1 | 1/2013 | Brown et al. | |
| 2013/0017524 A1 | 1/2013 | Barborak et al. | |
| 2013/0018652 A1 | 1/2013 | Ferrucci et al. | |
| 2013/0041921 A1 | 2/2013 | Cooper et al. | |
| 2013/0066886 A1 | 3/2013 | Bagchi et al. | |
| 2013/0110839 A1 | 5/2013 | Kirshenbaum | |
| 2013/0216984 A1* | 8/2013 | Cantrell | G09B 7/02 |
| | | | 434/219 |
| 2013/0344468 A1 | 12/2013 | Lindsay et al. | |
| 2014/0006012 A1 | 1/2014 | Zhou et al. | |
| 2014/0006448 A1 | 1/2014 | Mccall | |
| 2014/0120513 A1* | 5/2014 | Jenkins | G06F 17/27 |
| | | | 434/362 |
| 2014/0149446 A1 | 5/2014 | Kuchmann-Beauger et al. | |
| 2014/0172756 A1* | 6/2014 | Clark | G06N 5/022 |
| | | | 706/12 |
| 2014/0272909 A1* | 9/2014 | Isensee | G09B 7/02 |
| | | | 434/362 |
| 2014/0280087 A1* | 9/2014 | Isensee | G06F 17/30477 |
| | | | 707/723 |
| 2014/0298199 A1* | 10/2014 | Johnson, Jr. | H04L 65/403 |
| | | | 715/753 |
| 2014/0365502 A1* | 12/2014 | Haggar | G06N 5/02 |
| | | | 707/748 |
| 2015/0120718 A1* | 4/2015 | Luo | G06F 17/30699 |
| | | | 707/728 |
| 2015/0161106 A1* | 6/2015 | Barbetta | G06F 17/28 |
| | | | 434/362 |
| 2015/0161230 A1* | 6/2015 | Alkov | G06F 17/30705 |
| | | | 707/737 |
| 2015/0169395 A1* | 6/2015 | Giffels | G06F 11/0769 |
| | | | 714/57 |
| 2015/0172293 A1* | 6/2015 | Bittner | G06F 21/6245 |
| | | | 726/4 |
| 2015/0235132 A1* | 8/2015 | Allen | G06F 17/30864 |
| | | | 706/11 |
| 2015/0278264 A1* | 10/2015 | Balani | G06F 17/30345 |
| | | | 707/741 |
| 2015/0339290 A1* | 11/2015 | Mueller | G06F 17/2795 |
| | | | 704/9 |
| 2015/0347587 A1* | 12/2015 | Allen | G06F 17/30654 |
| | | | 707/725 |
| 2015/0356456 A1 | 12/2015 | Dubbels et al. | |
| 2016/0019280 A1* | 1/2016 | Unger | G06F 17/30646 |
| | | | 707/736 |
| 2016/0062735 A1 | 3/2016 | Wilber | |

FOREIGN PATENT DOCUMENTS

| | | |
|---|---|---|
| CN | 103870528 | 6/2014 |
| WO | WO02/29618 A1 | 4/2002 |
| WO | WO2010/104970 A1 | 9/2010 |

OTHER PUBLICATIONS

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

Yuan, Michael J., "Watson and healthcare, How natural language processing and semantic search could revolutionize clinical decision support", IBM developerWorks, IBM Corporation, Apr. 12, 2011, 14 pages.

List of IBM Patents of Patent Applications Treated as Related, Sep. 29, 2016, 2 pages.

* cited by examiner

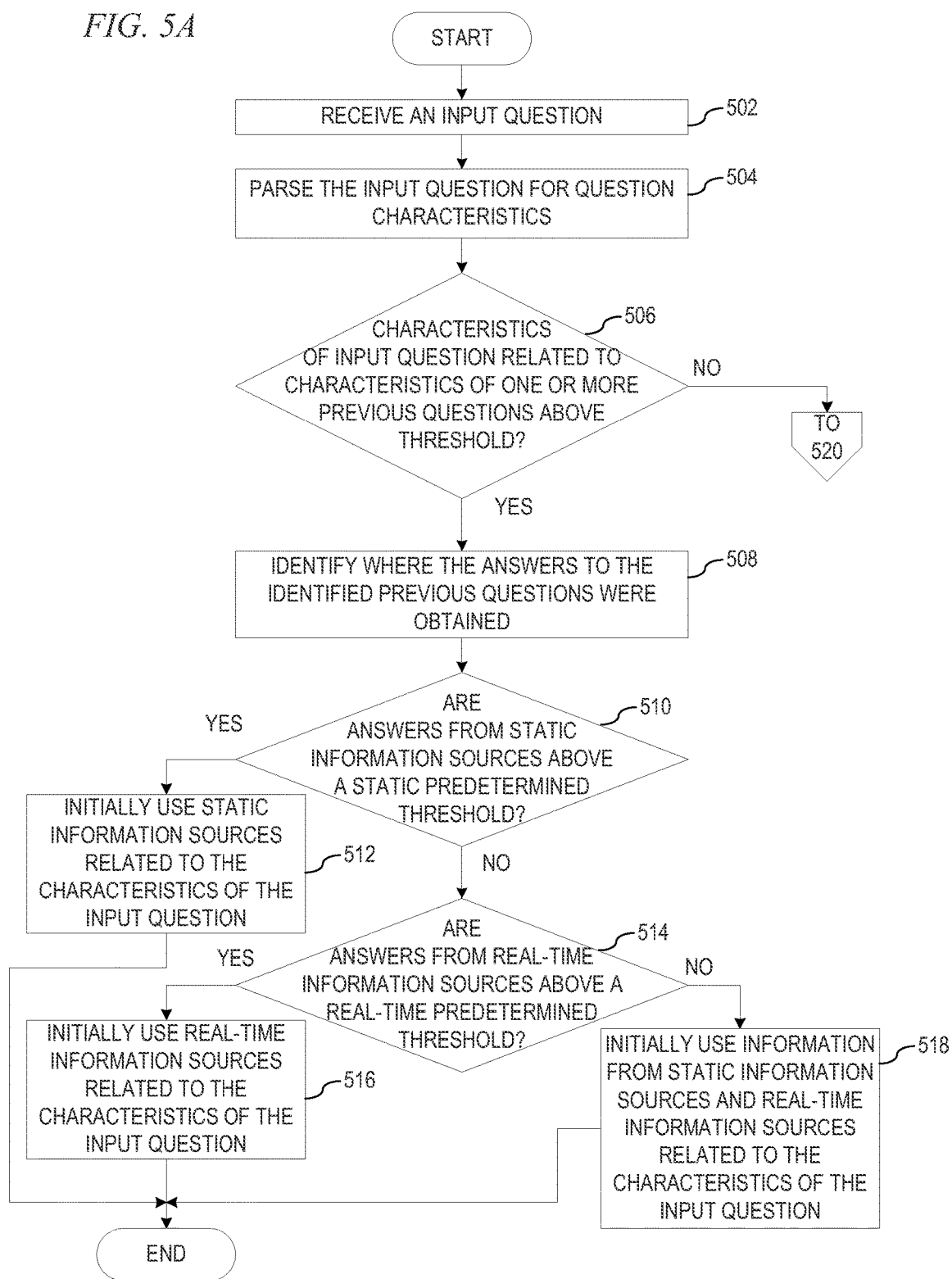

EFFECTIVE INGESTING DATA USED FOR ANSWERING QUESTIONS IN A QUESTION AND ANSWER (QA) SYSTEM

BACKGROUND

The present application relates generally to an improved data processing apparatus and method and more specifically to mechanisms for effectively ingesting data for answering questions in a Question and Answer (QA) system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

In one illustrative embodiment, a method, in a data processing system comprising a processor and a memory configured to implement a question and answer system (QA), is provided for effectively ingesting data for answering questions in the QA system. The illustrative embodiment parses a received input question having a set of question characteristics. The illustrative embodiment compares the set of question characteristics found in the received input question to question characteristics associated with a set of previous questions. The illustrative embodiment identifies whether answers to the one or more previous questions were obtained from static information sources or real-time information sources in response to the set of question characteristics found in the received input question matching the question characteristics associated with one or more previous questions in the set of previous questions above a related-question predetermined threshold. The illustrative embodiment initially utilizes real-time information sources related to the characteristics of the input question to answer the input question in response to the answers to the one or more previous questions being obtained from the real-time information sources above the predetermined real-time threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 5A and 5B depict a flowchart outlining an example operation of a QA system for effectively ingesting data for answering questions in the QA system in accordance with an illustrative embodiment.

DETAILED DESCRIPTION

Figure 1:
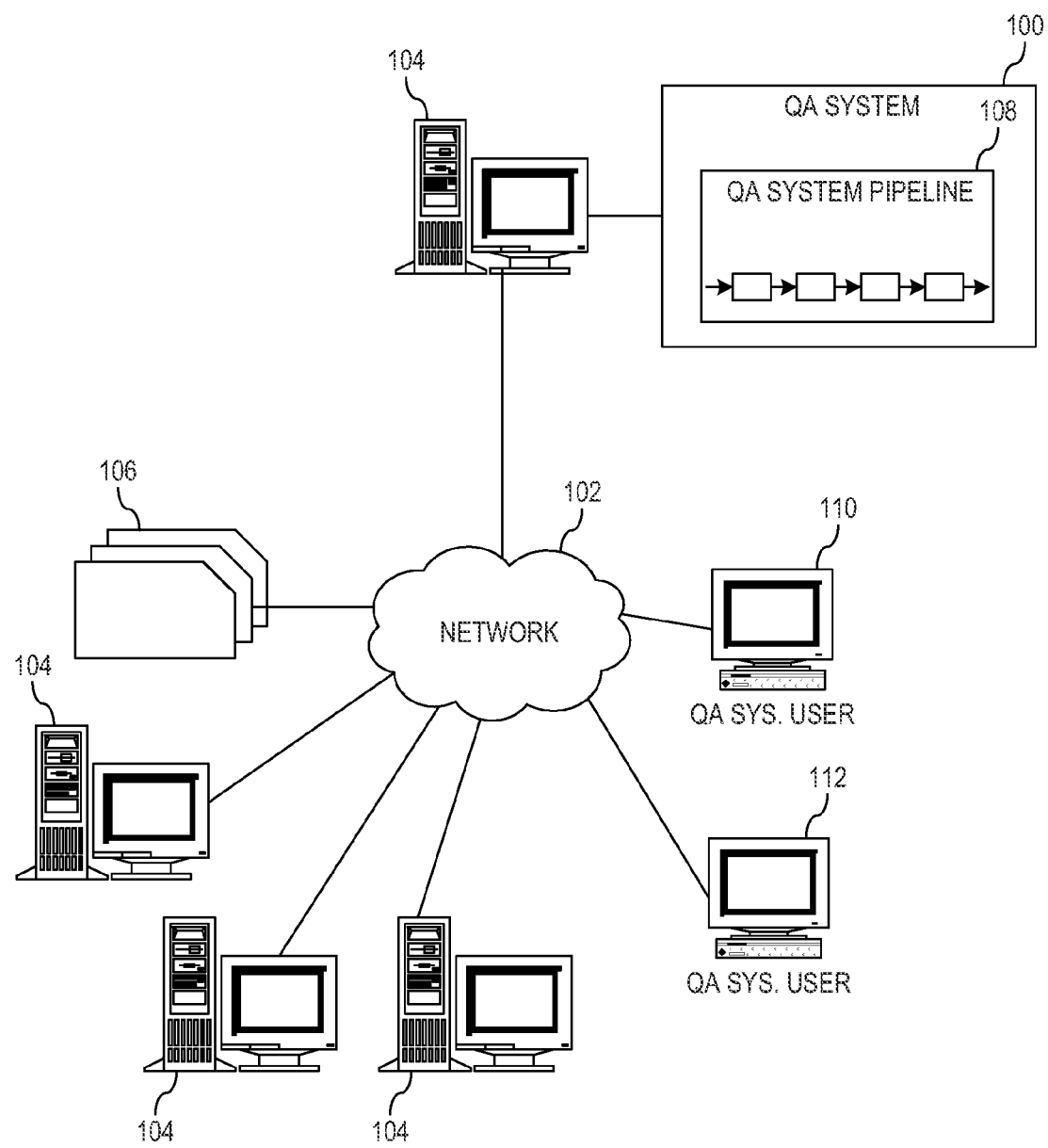
FIG. 1 is an example diagram of a distributed data processing system in which aspects of a Question and Answer system of the illustrative embodiments may be implemented.

Question and Answer (QA) systems, such as IBM's Watson™ QA system, require a significant amount of compute power to analyze a natural language question and determine the results from candidate findings. The identified candidate findings, as well as the other information from which the candidate findings are identified, may be obtained from static information sources, i.e. information sources that exhibit permanence, such as encyclopedias, books, journals, magazine articles, older web pages, or the like, as well as real-time information sources, i.e. information sources that exhibit impermanence, such as blogs, personal experiences, expert opinions, new web pages, or the like. In accordance with the illustrative embodiments, to exhibit permanence is for the information source to comprise content that is static or unchanged over a predetermined time period. Thus, any information source that comprises content that has changed within the predetermined time period exhibits impermanence. With the number and length of these various information sources, it is time and resource intensive to ingest all known data into the QA system. That is, QA systems operate using static information sources that are ingested and stored, both on topic and not on topic, in a corpora prior to a QA system event as well as access real-time information sources that are ingested and stored in the corpora during the QA event, both of which are time and resource intensive. However, the ingesting of static information from static information sources may not always be required if the topic is related current events and, likewise, the ingesting of real-time information from real-time information sources may not always be required if the topic is historical in nature.

Therefore, the illustrative embodiments provide for effectively ingesting data for answering questions in the QA system. That is, it is ideal to only ingest the most relevant data to the question set being asked, i.e. the topic. Thus, when a QA event is anticipated, the mechanisms of the illustrative embodiments perform an analysis of the topic for the QA event of how likely real-time information from real-time information sources is to help with answering questions of the topic and, if so, how much real-time ingestion to perform. The mechanisms consider the effectiveness of real-time information sources ingested in real-time for answering similar questions, as well as determining whether the topic is a trending topic and, thus, likely to require real-time ingested information.

In detail, in a deep-analytical question and answer (QA) system, the QA system overtime builds a database of asked questions and metadata about the candidate answers and answer evidence returned, such as how many real-time information sources were consulted to obtain the candidate answers, how many real-time information sources were used as evidence, how many static information sources were consulted to obtain the candidate answers, how many static information sources were used as evidence, and what percentage of evidence was from real-time information sources versus static information sources. In accordance with one illustrative embodiment, real-time information may be considered to be information that is approximately equal to the ingestion date.

Then, as a new QA event is anticipated or upon receiving a new question, the mechanisms of the illustrative embodiments utilize natural language processing (NLP) to analyze the question in order to perform a "similarity" check to the questions in the database. If one or more questions are close matches, the mechanisms average out a 'real-time data source effectiveness' for these questions. If none are close matches, the mechanisms average out the 'real-time data source effectiveness' for the entire question set in the database.

Additionally or alternatively, the mechanisms analyze the question for relevance to trending topics, such as the number of questions lately on this topic, the amount of evidence lately on this topic, topic trending, or the like. Further, with regard to a new QA event, the mechanism may prime the QA system for the QA event even before a question is received. For example, if a major event occurs, such as a tornado, political news, foreign takeover, or the like, from sources like National Emergency Network, CNN, Fox News, or the like, the mechanism may prime the QA system with information on the event.

Thus, utilizing any of the above indications from a received question and/or indication of a QA event, if the received question and/or QA event is determined to likely have effective real-time information sources, the mechanisms of the illustrative embodiments perform real-time ingestion for this question.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. FIGS. 1-5 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to analyzing natural language questions to determine missing information in order to improve accuracy of answers.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-5 are only examples and are not intended to state or imply any limitation with regard to the type of QA mechanisms with which the illustrative embodiments may be implemented. Many modifications to the example QA system shown in FIGS. 1-5 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of content links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify this question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of data 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, New York, which is augmented with the mechanisms of the illustrative embodiments described hereafter. The Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular knowledge domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM® Corporation website, IBM Redbooks®, and the like. For example, information about the Watson™ QA system can be found in Yuan et al., "Watson and Healthcare," IBM developerWorks®, 2011 and "The Era of Cognitive Systems: An Inside Look at IBM Watson and How it Works" by Rob High, IBM Redbooks®, 2012.

Figure 2:
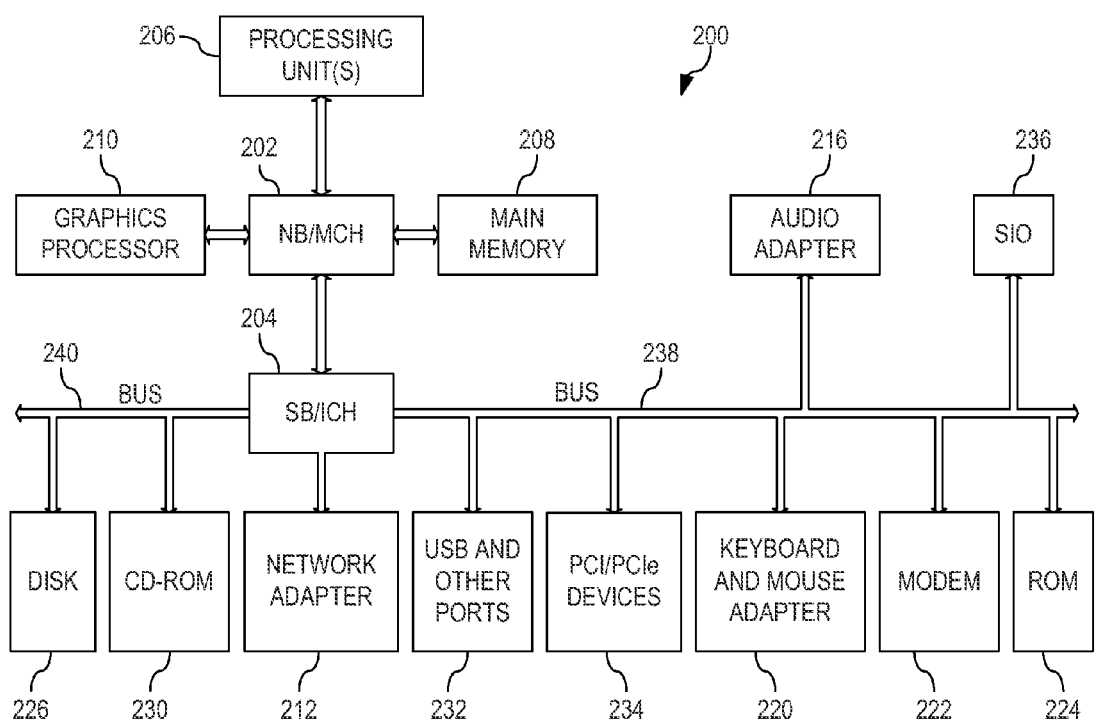
FIG. 2 is an example block diagram of a computing device in which aspects of the illustrative embodiments may be implemented.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
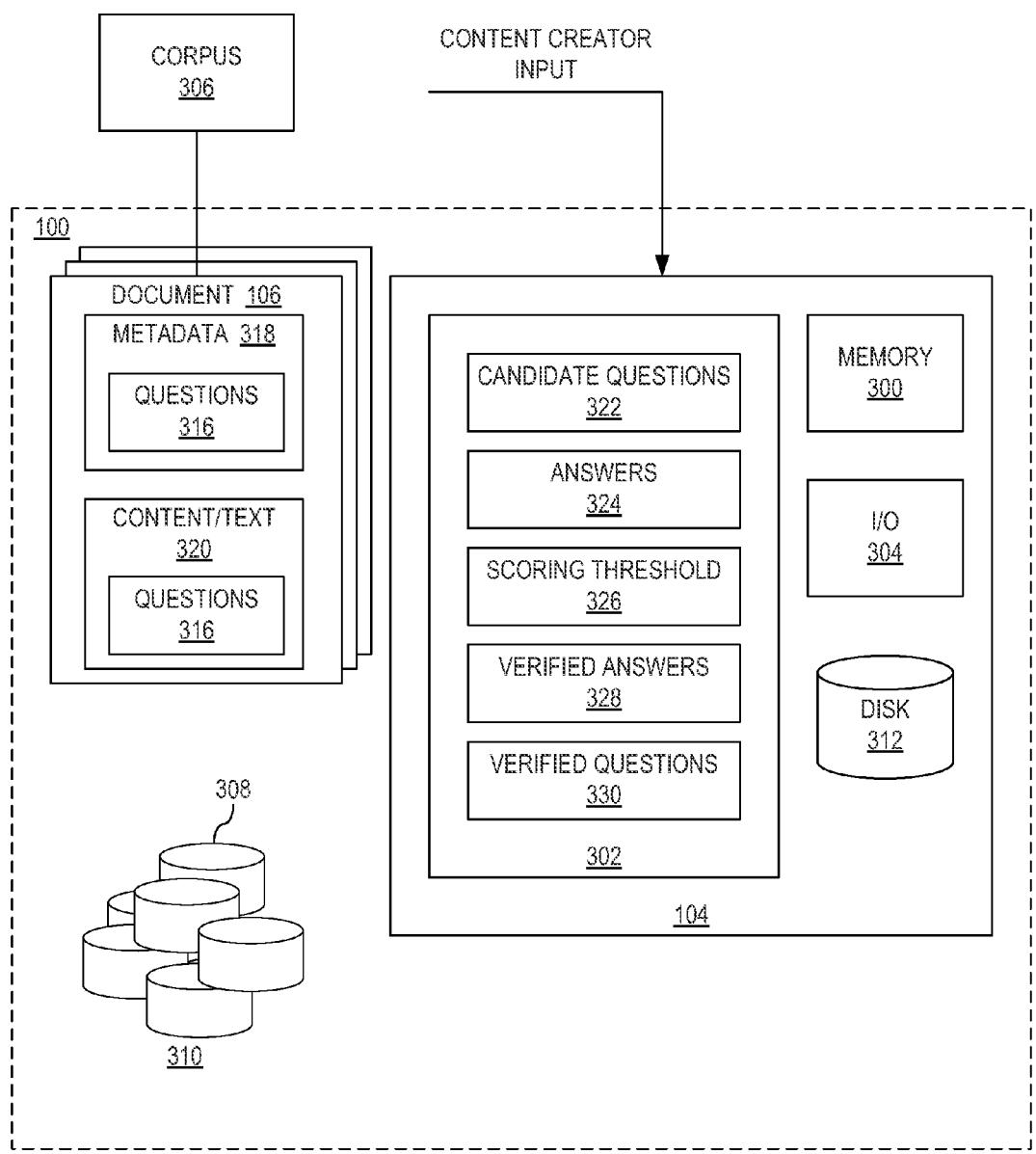
FIG. 3 depicts a schematic diagram of one embodiment of the QA system 100 of FIG. 1 in accordance with an illustrative embodiment.
Figure 4:
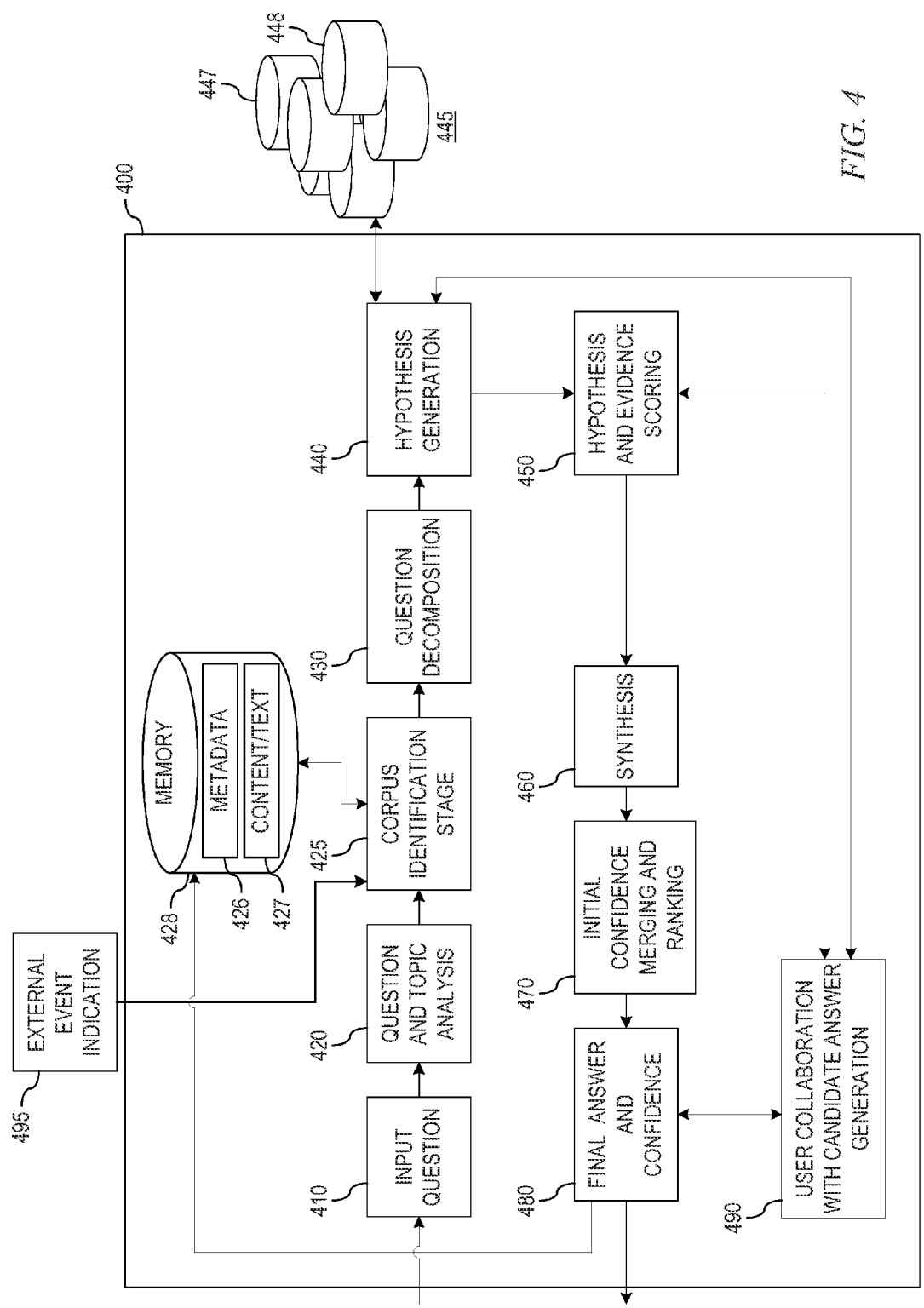
FIG. 4 illustrates a QA system pipeline for processing an input question in accordance with one illustrative embodiment.

FIG. 3 depicts a schematic diagram of one embodiment of QA system 100 of FIG. 1 in accordance with an illustrative embodiment. The depicted QA system 100 includes various components, described in more detail below, that are capable of performing the functions and operations described herein. In one embodiment, at least some of the components of QA system 100 are implemented in a computer system. For example, the functionality of one or more components of QA system 100 may be implemented by computer program instructions stored on computer memory device 300 and executed by a processing device, such as processor 302. QA system 100 may include other components, such as input/output devices 304 and at least one electronic document 106 from external corpus 306, which may be stored in internal corpus 308 within corpora 310 of QA system 100. In accordance with the illustrative embodiments, the electronic document 106 may be from static information sources, such as encyclopedias, books, journals, magazine articles, or the like, as well as real-time information sources, such as blogs, personal experiences, expert opinions, web pages, or the like. Some or all of the components of QA system 100 may be stored on a single computing device 104 or on a network of computing devices 104, including a wireless communication network. QA system 100 may include more or fewer components or subsystems than those depicted herein. In some embodiments, QA system 100 may be used to implement the methods described herein as depicted in FIG. 4 and may be augmented or configured to implement the additional operations, functionality, and features described hereafter with regard to the illustrative embodiments described in conjunction with the subsequent figures.

In one embodiment, QA system 100 includes at least one computing device 104 with processor 302 for performing the operations described herein in conjunction with QA system 100. Processor 302 may include a single processing device or multiple processing devices. Processor 302 may have multiple processing devices in different computing devices 104 over a network such that the operations described herein may be performed by one or more computing devices 104. Processor 302 is connected to and in communication with the memory device. In some embodiments, processor 302 may store and access data on memory device 300 for performing the operations described herein. Processor 302 may also be connected to disk 312, which may be used for data storage, for example, for storing data from memory device 300, data used in the operations performed by processor 302, and software for performing the operations described herein.

In one embodiment, QA system 100 ingests and/or processes electronic documents 106. Electronic documents 106 may be part of a larger external corpus 306 of data or content, which may contain electronic documents 106 related to a specific topic or a variety of topics. External corpus 306 of data may include any number of electronic documents 106 and may be stored in any location relative to QA system 100. QA system 100 may be capable of ingesting and/or processing any of electronic documents 106 in external corpus 306 of data for processing by processor 302. Processor 302 may communicate with memory device 300 or disk 312 to store data while external corpus 306 is being processed.

Electronic document 106 may also include a set of questions 316 generated by the content creator at the time the content was created. When the content creator creates the content in electronic document 106, the content creator may determine one or more questions that may be answered by the content or for specific use cases for the content. The content may be created with the intent to answer specific questions. The set of questions 316 may be inserted into the content, for example, by inserting the set of questions 316 into viewable content/text 320 or in metadata 318 associated with electronic document 106. In some embodiments, the set of questions 316 shown in viewable content/text 320 may be displayed in a list in electronic document 106 so that the content users may easily see specific questions answered by electronic document 106.

The set of questions 316 created by the content creator at the time the content is created may be detected by processor 302. Processor 302 may further create one or more candidate questions 322 from the content in electronic document 106. The candidate questions 322 include questions that are answered by electronic document 106, but that may not have been entered or contemplated by the content creator. The processor 302 may also attempt to answer the set of questions 316 created by the content creator and candidate questions 322 extracted from electronic document 106, "extracted" meaning questions that are not explicitly specified by the content creator but are generated based on analysis of the content.

In one embodiment, the processor 302 determines that one or more of the questions are answered by the content of electronic document 106 and lists or otherwise marks the questions that were answered in electronic document 106. QA system 100 may also attempt to provide answers 324 for the candidate questions 322. In one embodiment, QA system 100 provides answers 324 to the set of questions 316 created by the content creator before creating the candidate questions 322. In another embodiment, QA system 100 provides answers 324 to questions and the candidate questions 322 at the same time.

QA system 100 may score question/answer pairs generated by the system. In such an embodiment, question/answer pairs that meet a scoring threshold are retained, and question/answer pairs that do not meet the scoring threshold 326 are discarded. In one embodiment, QA system 100 scores the questions and answers separately, such that questions generated by QA system 100 that are retained meet a question scoring threshold, and answers found by the system 100 that are retained meet an answer scoring threshold. In another embodiment, each question/answer pair is scored according to a question/answer scoring threshold.

After creating candidate questions 322, QA system 100 may present the answers 324 and candidate questions 322 to the content creator for manual user verification. The content creator may verify the answers 324 and candidate questions 322 for accuracy and relatedness to the content of electronic document 106. The content creator may also verify that the candidate questions 322 are worded properly and are easy to understand. If the questions contain inaccuracies or are not worded properly, the content creator may revise the content accordingly. The answers 324 and candidate questions 322 that have been verified or revised may then be stored in the content of electronic document 106 as verified answers 328 and verified questions 330, either in viewable content/text 320, in metadata 318, or both. As stated previously, where answers 324 and candidate questions 322 originated from, i.e. a static information source or a real-time information source, may also be stored in viewable content/text 320, in metadata 318, or both, when one or more answers are provided to a user in response to a question as will be described in FIG. 4 that follows.

That is, FIG. 4 illustrates a QA system pipeline for processing an input question in accordance with one illustrative embodiment. The QA system pipeline of FIG. 4 may be implemented, for example, as QA system pipeline 108 of QA system 100 in FIG. 1. It should be appreciated that the stages of the QA system pipeline shown in FIG. 4 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 4 may be augmented, for example, in one or more of the stages to implement the improved mechanism of the illustrative embodiments described hereafter, additional stages may be provided to implement the improved mechanism, or separate logic from the pipeline 400 may be provided for interfacing with the pipeline 400 and implementing the improved functionality and operations of the illustrative embodiments.

As shown in FIG. 4, the QA system pipeline 400 comprises a plurality of stages 410-490 through which the QA system operates to analyze an input question and generate a response. In an initial input question stage 410, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 400, i.e. the question and topic analysis stage 420, parses the input question, using natural language processing (NLP) techniques, for question characteristics, such as average sentence length, various counts of sentence sub-structure, phrase boundaries, such as prepositional phrases, verb phrases, or the like, average word length, number of characters in a sentence, number of words in a passage, number of sentences in a passage, average sentence lexical composition, topic, or the like. Additionally, the question and topic analysis stage 420 parses the input question, using natural language processing (NLP) techniques, for further question characteristics, such as semantic keywords identifying one or more predicates, one or more arguments associated with the one or more predicates, and a set of temporal characteristics from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified question characteristics may then be used during the corpus identification stage 425 to determine an effectiveness of real-time information sources versus static information sources. The corpus identification stage 425 compares the question characteristics of the input question with characteristics of previous questions retained in metadata 426 and/or content/text 427 of memory 428. If the corpus identification stage 425 determines that the question characteristics relate to the characteristics of the previous questions in metadata 426 and/or content/text 427 above a related-question predetermined threshold, the corpus identification stage 425 determines where the answers to the identified previous questions were obtained, such as were the answers from real-time information sources, static information sources, or both. If the corpus identification stage 425 identifies that the answers were above a predetermined static threshold from static information sources, then the corpus identification stage 425 identifies that static information sources should initially be utilized in answering the input question, i.e. data already ingested in static corpus 447 of corpora 445, which will provide faster hypotheses. Alternatively, if the corpus identification stage 425 identifies that the answers were above a predetermined real-time threshold from real-time information sources, then the corpus identification stage 425 identifies that real-time information sources should initially be utilized in answering the input question, i.e. data to be real-time ingested into real-time corpus 448 of corpora 445.

If the corpus identification stage 425 determines that the question characteristics relate to the characteristics of the previous questions in metadata 426 and/or content/text 427 above the predetermined related-question threshold but neither the predetermined static threshold or predetermined real-time threshold are met, then the corpus identification stage 425 may utilize a combination of static information from static corpus 447 and real-time information from real-time corpus 448. If the corpus identification stage 425 determines that the question characteristics relate to the characteristics of the previous questions in metadata 426 and/or content/text 427 fail to be above the related-question predetermined threshold, the corpus identification stage 425 may analyze the input question for relevance to trending topics, such as the number of questions lately on this topic, the amount of evidence lately on this topic, topic trending, or the like. If the corpus identification stage 425 determines that the topic of the question relates other questions lately on the same topic then the corpus identification stage 425 identifies that real-time information sources should initially be utilized in answering the input question, i.e. data to be real-time ingested into real-time corpus 448 of corpora 445.

The identified major features may then be used during the question decomposition stage 430 to decompose the question into one or more queries that may be applied to static corpus 447 for an identified static use question or to real-time corpus 448 that will be identified and ingested from a real-time information source for an identified real-time use question, each of the one or more queries utilized in order to generate one or more hypotheses. The queries may be generated in any known or later developed query language, such as the Structure Query Language (SQL), or the like. The queries may be applied to one or more knowledge domains or databases storing information from static information sources, such as encyclopedias, books, journals, magazine articles, or the like that make up static corpus 447 or from real-time information sources, such as blogs, personal experiences, expert opinions, web pages, or the like, that make up real-rime corpus 448. That is, these various sources themselves, collections of sources, and the like, may represent different static corpus 447 or real-time corpus 448 within the corpora 445. There may be different static corpus 447 or real-time corpus 448 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM® Redbooks® documents. Any collection of content having some similar attribute may be considered to be a static corpus 447 or a real-time corpus 448 within the corpora 445.

The queries may be applied to one or more databases storing information about the electronic texts, documents, articles, websites, and the like, that make up the corpus of static data/information 447 or corpus of real-time data/information, e.g., the corpus of data 106 in FIG. 1. The queries being applied to the static corpus 447 or the real-time corpus 448 at the hypothesis generation stage 440 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 440, to generate hypotheses for answering the input question. These hypotheses are also referred to herein as "candidate answers" for the input question. For any input question, at this stage 440, there may be hundreds of hypotheses or candidate answers generated that may need to be evaluated.

The QA system pipeline 400, in stage 450, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, the hypothesis. Further, hypothesis and evidence scoring stage 450 also determines whether there is missing information and or ambiguous information that would increase the scoring of each candidate answer. That is, if a given candidate answer meets one or more of the annotators associated with the received question but has an additional annotator that is not identifiable or is unclear in the static corpus 447 or the real-time corpus 448, then hypothesis and evidence scoring stage 450 associates this missing or ambiguous information with the given candidate answer. Each reasoning algorithm in hypothesis and evidence scoring stage 450 generates a score based on the analysis it performs which indicates a measure of relevance of the individual portions of the corpus of data/information extracted by application of the queries, a measure of the missing or ambiguous information, as well as a measure of the correctness of the corresponding hypothesis, i.e. a measure of confidence in the hypothesis.

In the synthesis stage 460, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by an initial confidence merging and ranking stage 470 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate an initial ranked listing of hypotheses/candidate answers (hereafter simply referred to as "initial candidate answers").

At stage 480, a final answer and confidence score, or final set of candidate answers and confidence scores, may be generated using the final weights and output to the submitter of the original input question. The set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system. As shown in FIG. 4, in accordance the illustrative embodiments, after stage 480, or as part of stage 480, the set of candidate answers is output via a graphical user interface generated using the mechanisms of the illustrative embodiment, which provide the user with the tools for collaborating with the QA system to review, evaluate, and modify the listing of candidate answers and the evidence associated with these candidate answers that is evaluated by the QA system.

At user collaboration with candidate answer stage 490, the graphical user interface (GUI) that is generated comprises logic for receiving user inputs related to the evidence passages, e.g., words, phrases, sentences, and the like, for use in generating additional candidate answers and/or modifying current candidate answers. That is, via the GUI, the user may respond to a portion of the evidence passage to generate a new candidate answer and the GUI may feed that information back into the QA system pipeline 400, such as at stage 440 or 450, for use in evaluating current candidate answers and/or generating new candidate answers via the hypothesis and evidence scoring stage 450 using the various reasoning algorithms and generating relevance scores which may then be used to generate a confidence score for the newly generated candidate answer. As a result, the GUI may be updated to include the newly generated candidate answer in the portion of the GUI that outputs the ranked listing of candidate answers ranked by confidence, assuming that the confidence score for the newly generated candidate answer meets threshold requirements for depiction as a probable answer to the input question, e.g., a minimum confidence score, or may always output user generated candidate answers despite the candidate answer not meeting such threshold requirements. Similarly, the portion of the GUI that outputs the underlying evidence passages associated with candidate answers may be automatically updated to include entries for the newly generated candidate answer and its associated evidence passages.

Moreover, the GUI may include GUI elements for invoking logic and functionality of the GUI for removing evidence passages from the listing of associated evidence passages for the various candidate answers and/or modifying a relevance score associated with the evidence passage. In this way, the user essentially supersedes the evaluation made by the QA system pipeline 400 and instead imposes the user's subjective determination as to the relevance of an evidence passage by either eliminating it altogether or increasing/reducing the relevance score associated with the evidence passage to indicate the user's own subjective evaluation of the evidence passage's relevance to the candidate answer being the correct answer for the input question.

In addition, the GUI may include GUI elements for allowing a user to "drill down" within each evidence passage to obtain additional information about the source of the evidence passage. This drill down logic allows a user to select a link in the evidence passage output that results in the user being presented with information regarding the source of the evidence passage, the context in which the evidence passage is present within the source document, and the like. Thus, for example, if the user wishes to drill down to the source document to perform a more detailed analysis of the surrounding context of the evidence passage to determine whether the evidence passage is relevant to the candidate answer, or if other information may be gleaned from the context surrounding the evidence passage, then the drill down logic of the GUI may be used to achieve this. Other information that may be pertinent to the user's evaluation of the evidence passage may also be accessible via the drill-down logic including information regarding the reliability of the source document as a whole and other information for evaluating the veracity and reliability of the evidence passage.

Should the user eliminate the evidence passage or modify the evidence passage's relevance score in some manner, the QA system pipeline 400 may automatically adjust the relevance scores, confidence scores, and ranked listing of candidate answers based on the change to the evidence passage. In this way, the QA system pipeline 400 may dynamically adjust its output based on user collaboration with the QA system to provide the user's subject determination of the relevance, reliability, and correctness of the evidence passages and/or the candidate answers themselves.

With regard to the candidate answers themselves, the GUI may further provide GUI elements for eliminating candidate answers from the ranked listing of candidate answers and for providing free-form entry of new candidate answers. The GUI elements for eliminating the candidate answers, if selected, may remove the candidate answer from the ranked listing of candidate answers and may automatically result in the corresponding entries in the evidence passage portion of the GUI being removed. In this way, the candidate answer is completely removed as a candidate answer for the input question.

With regard to the free-form entry of new candidate answers, a text entry field, or the like, may be provided into which a user may type a candidate answer via a keyboard, enter via a speech-to-text mechanism, or any other way in which a user may enter a textual word, phrase, sentence, or the like. The newly entered candidate answer may be automatically added to the ranked listing of candidate answers and fed into the QA system pipeline 400, such as at stage 440 or 450, for evaluation, generation of relevance scores for extracted portions of the corpus of data/information, and generation of a confidence score for the newly generated candidate answer.

The processes described above may be done repeatedly as the user sees fit until the user is satisfied with the state of the ranked listing of candidate answers and the corresponding evidence passages associated with the candidate answers in the ranked listing of candidate answers. This information may then be stored in association with the input question, an identifier of the input question, one or more of the queries generated based on the input question, or the like, in metadata 426 and/or content/text 427 for later retrieval and use. When a final answer is agreed upon by the user and there is no more user collaboration at user collaboration with candidate answer stage 490, the final answer and confidence score stage 480 updates metadata 426 and/or content/text 427 with information such as, how many real-time information sources were consulted, how many real-time information sources were used as evidence, how many static information sources were consulted, how many static information sources were used as evidence, or, a percentage of evidence was from real-time information sources versus static information sources for those instances where both static information sources and real-time information sources were utilized.

This stored information may also be used for training purposes to train the QA system, e.g., training the operation of the statistical model of the QA system, modifying weights assigned to reasoning algorithms, or the like. This information may also be used to compare results generated by the QA system when evaluating a subsequent submission of the same or similar input question in order to see how the corpus of data/information has changed over time and/or how these changes may have changed the resulting candidate answers generated by the QA system, e.g., comparing the stored candidate answers and corresponding evidence passages with the later generated candidate answers and corresponding evidence passages and identifying the differences. The stored information may also be used as a cache of sorts to provide a quick retrieval of results of similar input questions or similar queries. Other uses of the stored information may also be made based on the operation of the mechanisms of the illustrative embodiments generating this stored information.

In addition to or as an alternative to the corpus identification stage 425 to determine an effectiveness of real-time information sources versus static information sources based on identified question characteristics from an input question, the corpus identification stage 425 may receive input from sources other than an input question received in initial input question stage 410 with which to prepare QA system pipeline 400 for a QA event. That is, upon receiving external event indication 495 from an external source, corpus identification stage 425 may prime the QA system for the QA event even before a question is received in the initial input question stage 410. For example, if a major event occurs, such as a tornado, political news, foreign takeover, or the like, from sources like National Emergency Network, CNN, Fox News, or the like, the corpus identification stage 425 may prime QA system pipeline 400 with information on the event.

Thus, using the mechanisms described above, or equivalent mechanisms in other QA systems generally known in the art which are augmented to include the GUI logic mechanisms of the illustrative embodiments, a system is developed that can be used to analyze natural language questions to alter the confidence scores of answers produced by a QA system based on temporal sensitivity of predicates and/or arguments associated with the predicates in the questions. One or more predicates and one or more arguments associated with the one or more predicates are required for defining temporal characteristics, because the exact object under investigation changes the semantics of temporal operators.

Figure 5B:
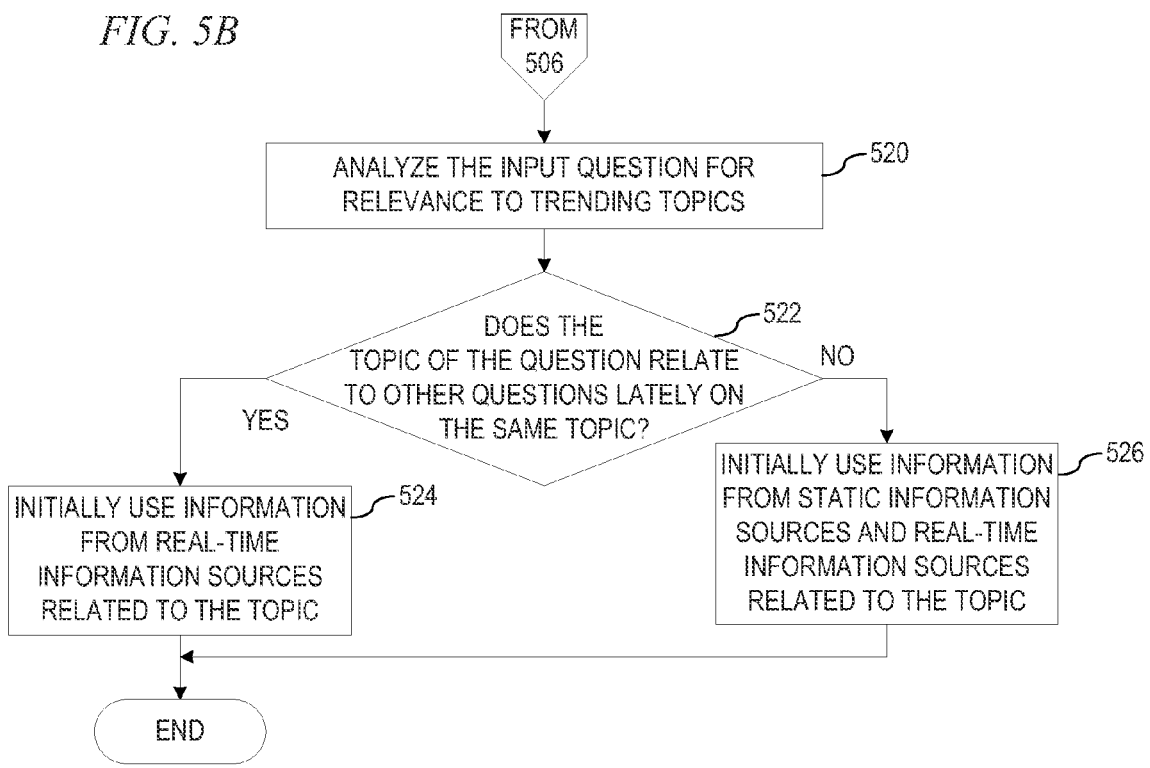

FIGS. 5A and 5B depict a flowchart outlining an example operation of a QA system for effectively ingesting data for answering questions in the QA system in accordance with an illustrative embodiment. As the operation begins, the QA system receives an input question that is presented in a natural language format (step 502). The QA system parses the input question, using natural language processing (NLP) techniques, for question characteristics (step 504), such as average sentence length, various counts of sentence substructure, phrase boundaries, such as prepositional phrases, verb phrases, or the like, average word length, number of characters in a sentence, number of words in a passage, number of sentences in a passage, average sentence lexical composition, topic, or the like.

The QA system compares the question characteristics of the input question with characteristics of previous questions retained in metadata and/or content/text of a memory (step 506). If at step 506 the QA system determines that the question characteristics relate to one or more characteristics of previous questions above a related-question predetermined threshold, the QA system identifies where the answers to the identified previous questions were obtained (step 508), such as were the answers from real-time information sources, static information sources, or both. Utilizing the location information, the QA system determines whether the answers were above a predetermined static threshold from static information sources (step 510). If at step 510 the answers were above a predetermined static threshold from static information sources, then the QA system identifies that static information sources related to the characteristics of the input question should initially be utilized in answering the input question (step 512), with the operation ending thereafter.

If at step 510 the answers are not above the predetermined static threshold from static information sources, the QA system determines whether the answers were above a predetermined real-time threshold from real-time information sources (step 514). If at step 514 the QA system identifies that the answers were above a predetermined real-time threshold from real-time information sources, then the QA system identifies that real-time information sources related to the characteristics of the input question should initially be utilized in answering the input question (step 516), with the operation ending thereafter. If at step 514 the QA system determines that the answers are not above the predetermined real-time threshold from real-time information sources, then the QA system identifies that a combination of static information sources and real-time information sources related to the characteristics of the input question should initially be utilized in answering the input question (step 518), with the operation ending thereafter.

If at step 506 the QA system determines that the question characteristics relate to the characteristics of the previous questions fail to be above the related-question predetermined threshold, the QA system analyzes the input question for relevance to trending topics (step 520), such as the number of questions lately on this topic, the amount of evidence lately on this topic, topic trending, or the like. The QA system then determines whether the topic of the question relates to other questions lately on the same topic (step 522). If at step 522 the QA system determines that the topic of the question relates to other questions lately on the same topic, then the QA system identifies that real-time information sources related to the topic should initially be utilized in answering the input question (step 524), with the operation ending thereafter. If at step 522 the QA system determines that the topic of the question fails to relate to other questions lately on the same topic, then the QA system identifies that a combination of static information sources and real-time information sources related to the topic should initially be utilized in answering the input question (step 526), with the operation ending thereafter.

As noted above, it should be appreciated that the illustrative embodiments may take the form of an entirely hardware embodiment, an entirely software embodiment, or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory configured to implement a question and answer (QA) system, for effectively ingesting data for answering questions in the QA system, the method comprising:

parsing, by a processor in the QA system, a received input question having a set of question characteristics;

comparing, by the processor, the set of question characteristics found in the received input question to question characteristics associated with a set of previous questions;

responsive to the set of question characteristics found in the received input question matching the question characteristics associated with one or more previous questions in the set of previous questions above a related-question predetermined threshold, identifying, by the processor, whether answers to the one or more previous questions were obtained from static information sources or real-time information sources; and responsive to the answers to the one or more previous questions being obtained from the real-time information sources above the predetermined real-time threshold, initially utilizing, by the processor, real-time information sources related to the characteristics of the input question to answer the input question.

2. The method of claim 1, further comprising:

responsive to the answers to the one or more previous questions failing to be obtained from the real-time information sources above the predetermined real-time threshold and responsive to the answers to the one or more previous questions being obtained from the static information sources above a predetermined static threshold, initially utilizing, by the processor, static information sources related to the characteristics of the input question to answer the input question.

3. The method of claim 1, further comprising:

responsive to the answers to the one or more previous questions failing to be obtained from the real-time information sources above the predetermined real-time threshold and responsive to the answers to the one or more previous questions failing to be obtained from the static information sources above a predetermined static threshold, initially utilizing, by the processor, both real-time information sources and static information sources related to the characteristics of the input question to answer the input question.

4. The method of claim 1, wherein static information sources are information sources that exhibit permanence.

5. The method of claim 1, wherein real-time information sourc information sources that exhibit impermanence.

6. The method of claim 1, further comprising:

responsive to the set of question characteristics found in the received input question failing to matching the question characteristics associated with one or more previous questions in the set of previous questions above the related-question predetermined threshold, analyzing, by the processor, the input question for relevance to trending topics; and responsive to a topic of the input question matching a trending topic, initially utilizing, by the processor, real-time information sources related to the topic of the input question to answer the input question.

7. The method of claim 6, further comprising:

responsive to a topic of the input question failing to match a trending topic, initially utilizing, by the processor, both real-time information sources and static information sources related to the topic of the input question to answer the input question.

8. The method of claim 1, further comprising:

receiving, by the processor, an indication of an external event; and ingesting, by the processor, data related to the external event prior to receiving the input question.

9. A computer program product comprising a non-transitory computer readable storage medium having a computer readable program stored therein, wherein the computer readable program, when executed on a computing device, causes the computing device to:

parse a received input question having a set of question characteristics;

compare the set of question characteristics found in the received input question to question characteristics associated with a set of previous questions;

responsive to the set of question characteristics found in the received input question matching the question characteristics associated with one or more previous questions in the set of previous questions above a related-question predetermined threshold, identify whether answers to the one or more previous questions were obtained from static information sources or real-time information sources; and responsive to the answers to the one or more previous questions being obtained from the real-time information sources above the predetermined real-time threshold, initially utilize real-time information sources related to the characteristics of the input question to answer the input question.

10. The computer program product of claim 9, wherein the computer readable program further causes the computing device to:

responsive to the answers to the one or more previous questions failing to be obtained from the real-time information sources above the predetermined real-time threshold and responsive to the answers to the one or more previous questions being obtained from the static information sources above a predetermined static threshold, initially utilize static information sources related to the characteristics of the input question to answer the input question.

11. The computer program product of claim 9, wherein the computer readable program further causes the computing device to:

responsive to the answers to the one or more previous questions failing to be obtained from the real-time information sources above the predetermined real-time threshold and responsive to the answers to the one or more previous questions failing to be obtained from the static information sources above a predetermined static threshold, initially utilize both real-time information sources and static information sources related to the characteristics of the input question to answer the input question.

12. The computer program product of claim 9, wherein the computer readable program further causes the computing device to:

responsive to the set of question characteristics found in the received input question failing to matching the question characteristics associated with one or more previous questions in the set of previous questions above the related-question predetermined threshold, analyze the input question for relevance to trending topics; and responsive to a topic of the input question matching a trending topic, initially utilize real-time information sources related to the topic of the input question to answer the input question.

13. The computer program product of claim 12, wherein the computer readable program further causes the computing device to:

responsive to a topic of the input question failing to match a trending topic, initially utilize both real-time information sources and static information sources related to the topic of the input question to answer the input question.

14. The computer program product of claim 9, wherein the computer readable program further causes the computing device to:

receive an indication of an external event; and
ingest data related to the external event prior to receiving the input question.

15. An apparatus comprising:
a processor; and
a memory coupled to the processor, wherein the memory comprises instructions which, when executed by the processor, cause the processor to:

parse a received input question having a set of question characteristics;

compare the set of question characteristics found in the received input question to question characteristics associated with a set of previous questions;

responsive to the set of question characteristics found in the received input question matching the question characteristics associated with one or more previous questions in the set of previous questions above a related-question predetermined threshold, identify whether answers to the one or more previous questions were obtained from static information sources or real-time information sources; and responsive to the answers to the one or more previous questions being obtained from the real-time information sources above the predetermined real-time threshold, initially utilize real-time information sources related to the characteristics of the input question to answer the input question.

16. The apparatus of claim 15, wherein the instructions further cause the processor to:

responsive to the answers to the one or more previous questions failing to be obtained from the real-time information sources above the predetermined real-time threshold and responsive to the answers to the one or more previous questions being obtained from the static information sources above a predetermined static threshold, initially utilize static information sources related to the characteristics of the input question to answer the input question.

17. The apparatus of claim 15, wherein the instructions further cause the processor to:

responsive to the answers to the one or more previous questions failing to be obtained from the real-time information sources above the predetermined real-time threshold and responsive to the answers to the one or more previous questions failing to be obtained from the static information sources above a predetermined static threshold, initially utilize both real-time information sources and static information sources related to the characteristics of the input question to answer the input question.

18. The apparatus of claim 15, wherein the instructions further cause the processor to:

responsive to the set of question characteristics found in the received input question failing to matching the question characteristics associated with one or more previous questions in the set of previous questions above the related-question predetermined threshold, analyze the input question for relevance to trending topics; and responsive to a topic of the input question matching a trending topic, initially utilize real-time information sources related to the topic of the input question to answer the input question.

19. The apparatus of claim 18, wherein the instructions further cause the processor to:

responsive to a topic of the input question failing to match a trending topic, initially utilize both real-time information sources and static information sources related to the topic of the input question to answer the input question.

20. The apparatus of claim 15, wherein the instructions further cause the processor to:
receive an indication of an external event; and
ingest data related to the external event prior to receiving the input question.

* * * * *